Figure 1:
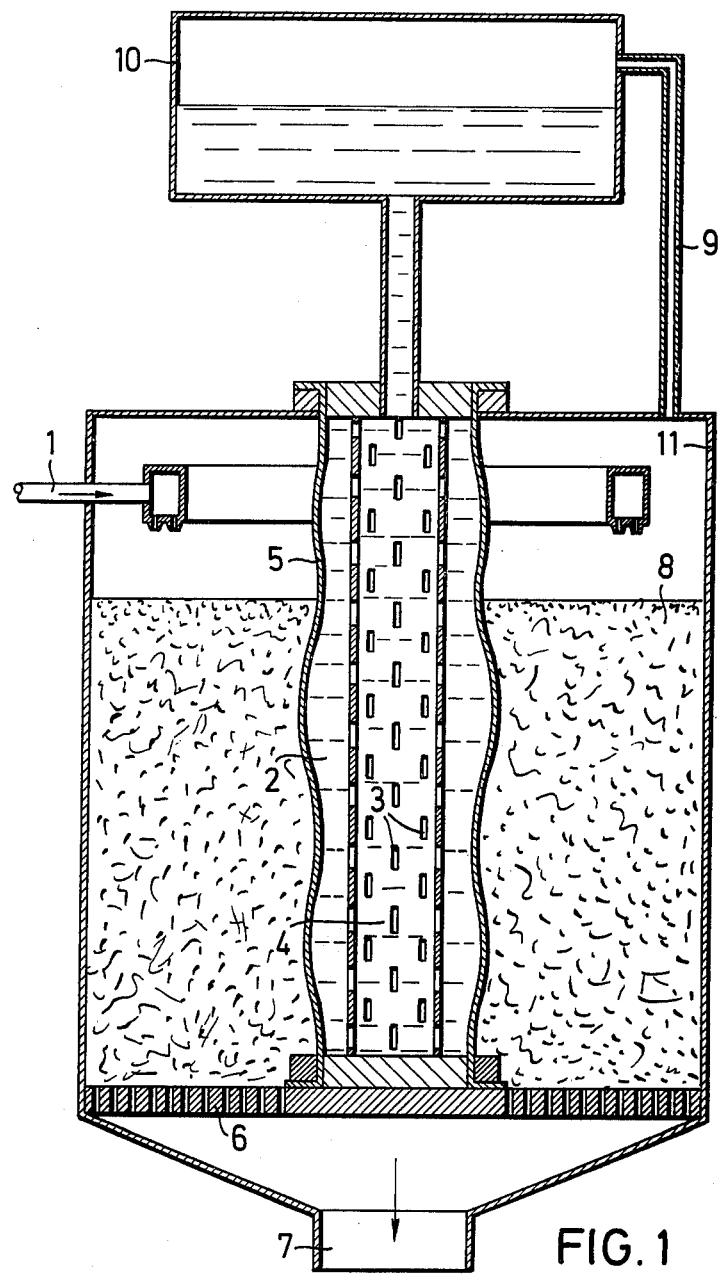

United States Patent [19]

Mikule et al.

[11] 3,965,000

[45] June 22, 1976

[54] METHOD FOR OPERATING ION EXCHANGE COLUMNS

[75] Inventors: Jiri Mikule; Hans Georg Schneider, both of Euskirchen, Germany

[73] Assignee: Industrial Filter & Pump Mfg. Co., Cicero, Ill.

[22] Filed: Aug. 26, 1974

[21] Appl. No.: 500,568

Related U.S. Application Data

[63] Continuation of Ser. No. 307,102, Nov. 16, 1972, abandoned.

[52] U.S. Cl. ............................... 210/24; 210/351
[51] Int. Cl.² ...................................... B01D 15/00
[58] Field of Search ............... 210/25, 97, 120, 137, 210/287, 350, 351, 24

[56] References Cited
UNITED STATES PATENTS 3,180,825   4/1965   Couvreur et al. ................... 210/350

FOREIGN PATENTS OR APPLICATIONS 1,348,973   12/1963   France ................................. 210/30

Primary Examiner—Charles N. Hart
Assistant Examiner—Ivars Cintins

[57] ABSTRACT

The invention relates to a method of operating columns filled with ion exchanger resins as well as an apparatus for carrying out the said method.

5 Claims, 3 Drawing Figures

METHOD FOR OPERATING ION EXCHANGE COLUMNS

This is a continuation of application Ser. No. 307,102, filed Nov. 16, 1972, now abandoned.

Ion exchanger resins, particularly weakly acid and basic resins, are subject to considerable variations in volume during charging and regeneration. These variations can only be accommodated by the free space above the ion exchanger bed if the bed height is not substantially more than 2 m. This is however untenable where slender exchanger columns are involved, i.e., where the proportion of height to diameter of the bed is more than 1 and is particularly 3 or more. The swelling pressures occurring in slender columns due to volume expansion result in considerable pressure on the ion exchanger bed. This process compresses intensely and shatters the particles of resin. The resultant proportion of fine material clogs the pores of the bed so that the efficiency of the columns filled with the ion exchanger resin is substantially diminished. Intensified flush-back through the bed is necessary in order to remove therefrom the fines which at the same time represent a considerable cost factor in terms of material waste. In some cases, the swelling pressure may even cause the shell of the column to split.

Attempts have been made, by multiple sub-division of the exchanger columns into a plurality of exchanger beds of larger diameter than height, to absorb the volume expansion of ion exchanger resin. Such apparatuses, however, involve increased technical complication and afford no remedy in the case of high slender columns to which one must have recourse, particularly in the separation of substances.

It is moreover known to dispose in the exchanger column a rubber bag which can be inflated with water so that, at the time of regeneration, the bed can be maintained in a tightly packed state and the floating of ion exchanger resin suspension up into the free space above the bed avoided.

The invention provides a solution for the problem of compensating for the volume fluctuations of an ion exchanger resin bed with means which are reversibly compressible.

According to the invention, this problem is resolved in that reversibly compressible means are so located in an exchanger column that volume fluctuations which occur during the charging and regeneration of ion exchanger resins are absorbed by the said means.

This method is equally applicable to ion exchanger processes, i.e. the exchange of cations from an aqueous solution for the cations or hydrogen ions of the resin or the exchange of anions from an aqueous solution for the anions or hydroxyl ions of the resin, in the case of ion exclusion processes such as for example for the cleaning and desalination of sugar solutions, and in material separation processes, for example the separation of sugars from exchanger resins charged with bivalent and multivalent cations.

The reversibly compressible means comprise for example a hose disposed concentrically of the inner wall of the column, a liquid being located displaceably between the hose and the interior wall of the column. This liquid can communicate with an expansion vessel within or outside of the column.

According to a further feature of the invention, there are positioned in the interior of the column one or a plurality of rigid cylinders of bed or column height which are enclosed by a hose which can be expanded by being filled with liquid. The rigid cylinders are perforated or of lattice-like construction or provided with a plurality of apertures so that also the interior of the cylinder becomes available for the displaceable liquid and, moreover, in order that lines to the expansion vessel can easily be provided.

It has been found that it may already be adequate for the reversibly compressible volume of liquid to be approximately 5% of the volume of the resin bed. Preferably, however, the compressible quantity of liquid in the hoses is between 10 and 30% by volume.

Ideally, the density of the displaceable liquid may be equal to or greater than that of the suspension of ion exchanger resin and the product to be cleaned or isolated, and the regeneration liquid, in order to avoid buoyancy displacing the liquid out of the hose.

As is already known, ion exchanger columns are frequently operated at over-pressure. In such a case, the over-pressure can be compensated by providing for communication of the expansion vessel, so that the pressures in the gas-filled spaces can be equalised.

Three examples of embodiment of the invention are explained in greater detail hereinafter, with reference to the attached FIGS. 1, 2 and 3.

FIG. 1 shows a column 11 with an ion exchange resin bed 8, an annular feed 1, an outlet 7 and a permeable bottom plate 6. Located centrally in the column is a fixed cylinder 4 with apertures 3, which is enclosed by a hose 5. Between the hose and the cylinder and also by virtue of the apertures in the cylinder, there is a displaceable liquid 2 which communicates with the liquid in an equalising or expansion tank 10. Furthermore, means of communication 9 between the gas-filled space above the resin bed and the gas-filled space above the liquid in the expansion tank has been provided, so that the column can also be operated at over-pressure.

Figure 2:
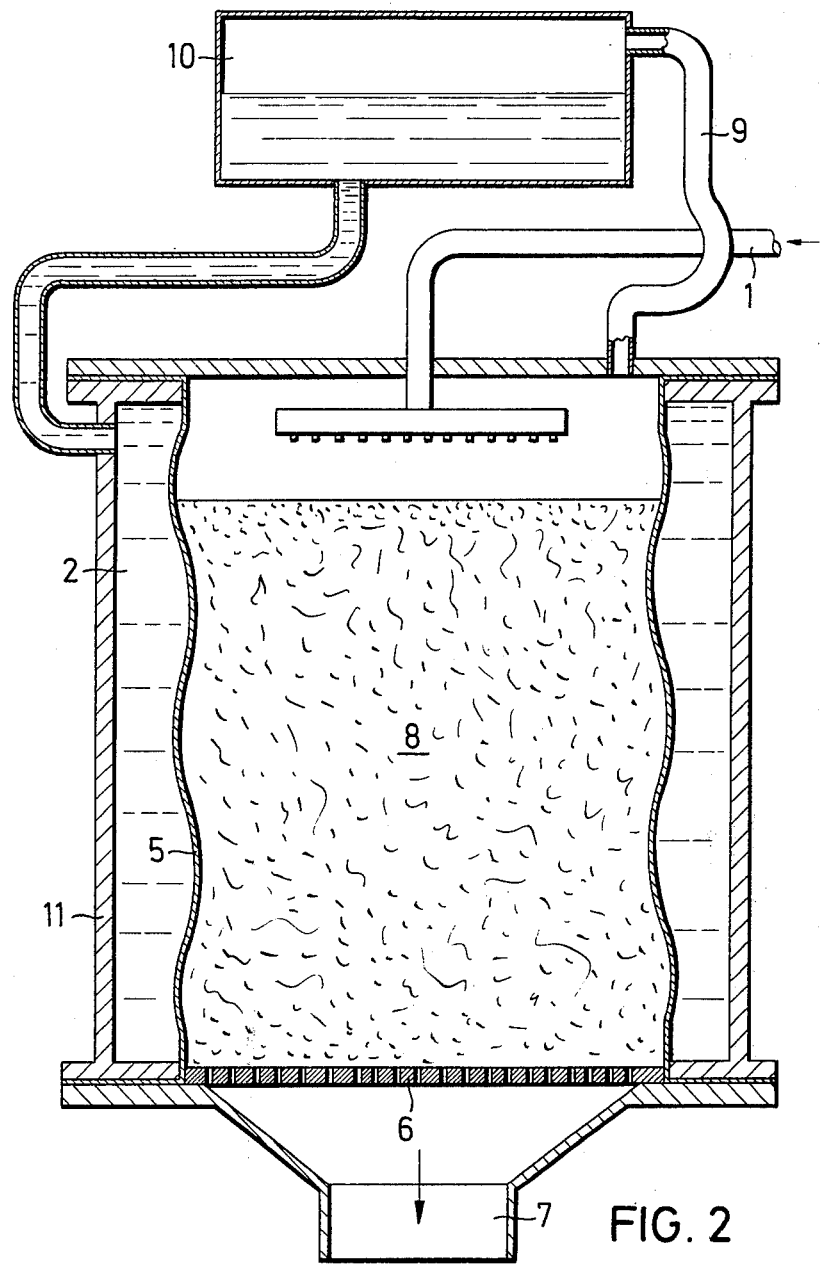

FIG. 2 shows a form of embodiment in which displaceable liquid 2 is located between the inside wall of the column 11 and a hose 5 located concentrically with respect to the inside wall. The displaceable liquid likewise communicates with the liquid in an expansion tank 10 and the gas-filled space above the resin bed 8 communicates with that in the expansion tank 10, so that also this installation can be operated at over-pressure.

In case of high columns, differences in pressure throughout the height of the column occur during operation in the high column of resin as a result of the pressure drop. For example, the pressure drop at the bottom of the column amounts to about 1.8 atm. with an equal level of the displaceable liquid and the liquid to be processed of 5 m, nearly the same density of both liquids, the same gas pressure of 2.3 atm. (absolute) above both liquids, and free discharge of the liquid to be processed. Accordingly, the hose 5 has an equally high internal pressure at this point. In order to avoid the pressure drop of a high column of resin, it is recommendable instead of connecting the gas chambers above the displaceable liquid and the liquid to be processed to provide means which allow the regulation of the pressure of the displaceable liquid at different height regardless of the respective pressure of the bed of resin. This can, for example, be realized in that the column of the displaceable liquid is lower than that of the liquid to be processed so that a gas chamber is provided above the displaceable liquid corresponding to the upper portion of the column of liquid to be processed. Thereby, the hydrostatic pressure of the displaceable liquid is decreased at the bottom of the column.

Another, particularly preferred possibility of compensating the differences in pressure along the height of the ion exchange column is subdivide the space for the displaceable liquid, i.e. the space within the hose according to FIG. 1, or between hose and wall according to FIG. 2, into several superposed chambers each having a separate gas chamber.

This subdivision in several superposed chambers is advantageous — with respect to the apparatus — as compared with a single hose of a height equal to the entire height of the column and which is not or only partially filled with liquid.

Figure 3:
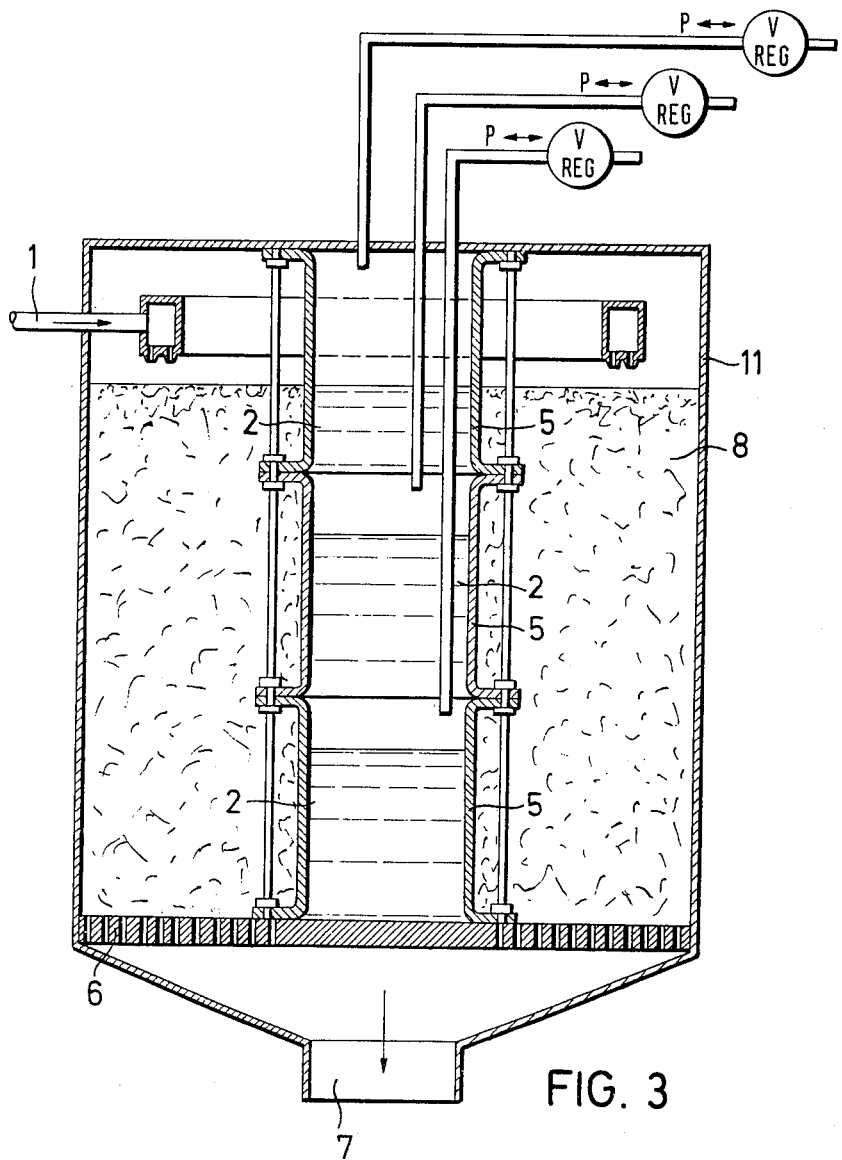

FIG. 3 shows such a particularly preferred form of embodiment where the hose is subdivided into three chambers 5 which are only partly filled with displaceable liquid 2. The desired pressure within the chambers can then be adjusted by the height of the liquid column and the selected gas pressure above the displaceable liquid. Other examples of reversibly compressible means by which the volume variations of the bed of ion exchange resin can be compensated are elastic foam substances having closed cells, substances made of elastic aereted plastics (e.g. latex foam rubber) having a non-porous outer skin or small or larger rubber balls which are to be fixed at a specific height of the bed.

We claim:

1. A method of maintaining a constant head of expandable granular material in a column through which a liquid to be treated is passed, said granular material being ion exchange resin which expands when used to treat said liquid, comprising the steps of vertically mounting a resilient, imperforate, deformable tubular member in said column to provide a first compartment within said member and a second compartment surrounding said member, partially filling one of said compartments with said granular material so as to leave an open space above said granular material in said one of said compartments, completely filling the other of said compartments with liquid, providing a closed liquid reservoir chamber above said column, partially filling said reservoir chamber with liquid connecting the top of said other compartment to a location in said reservoir below the liquid level therein, connecting said space in said one compartment above said granular material to a location in said reservoir chamber above said liquid level, and passing the liquid to be treated through said one of said compartments, whereby expansion of said granular material deforms said tubular member to force liquid up into said reservoir to maintain a constant head in said column.

2. A method according to claim 1 wherein the compartment surrounding said tubular member is partially filled with said granular material.

3. A method according to claim 2 including the further step of
    mounting a rigid, perforate tube within said tubular member,
    said tube extending from the top to the bottom of said column with the interior of said tube connected to a location in said reservoir below the level of liquid therein.

4. A method according to claim 1 wherein the compartment within said tubular member is partially filled with said granular material.

5. A method according to claim 1 including the step of
    selecting the length of the tubular member such that it extends from the bottom of the bed of said granular material to a location in said column above said granular material.

* * * * *